(12) United States Patent
Netz et al.

(10) Patent No.: US 6,856,114 B2
(45) Date of Patent: Feb. 15, 2005

(54) SYSTEM FOR MEASURING MOTOR ROTOR POSITION

(75) Inventors: Achim Netz, Seeheim-Jugenheim (DE); Sighard Schräbler, Frankfurt (DE); Holger Lüdtke, Frankfurt am Main (DE); Peter Stauder, Mainz (DE); Marcus Schulz, Bad Soden (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/479,024

(22) PCT Filed: May 28, 2002

(86) PCT No.: PCT/EP02/05860
§ 371 (c)(1),
(2), (4) Date: Nov. 25, 2003

(87) PCT Pub. No.: WO02/097961
PCT Pub. Date: Dec. 5, 2002

(65) Prior Publication Data
US 2004/0150364 A1 Aug. 5, 2004

(30) Foreign Application Priority Data
May 30, 2001 (DE) .......................................... 101 26 146

(51) Int. Cl.[7] .............................................. H02P 1/46
(52) U.S. Cl. ...................... 318/701; 318/254; 318/700; 318/715; 318/720; 318/721
(58) Field of Search ................................ 318/254, 700, 318/701, 715, 720, 721, 432, 138, 439

(56) References Cited

U.S. PATENT DOCUMENTS

| | | |
|---|---|---|
| 4,992,710 A | 2/1991 | Cassat |
| 5,144,564 A | 9/1992 | Naidu et al. |
| 5,339,012 A | 8/1994 | Schroedl et al. |
| 5,569,990 A | 10/1996 | Dunfield |
| 5,635,810 A * | 6/1997 | Goel .......................... 318/719 |

(List continued on next page.)

FOREIGN PATENT DOCUMENTS

DE           4103270           5/1992

OTHER PUBLICATIONS

Bruguier C et al: 'ID–Model control of a synchronous motor without position and speed sensor' Applied Power Electronics Conference and Exposition, 1995. APE '95. Conference Proceedings 1995, Tenth Annual Dallas, TX, USA Mar. 5–9, 1995, New York, NY, USA IEEE, US, pp. 387–391, XP010147613 ISBN: 0–7803–2482–X, p. 387; illustration 1.

*Primary Examiner*—Rina Duda
(74) *Attorney, Agent, or Firm*—Honigman Miller Schwartz and Cohn LLP

(57) ABSTRACT

The present invention relates to a method for the sensorless electric measurement of the position of a rotor of a permanently excited synchronous machine that is fed by a converter, by means of measuring signals which are sent to an evaluation device that calculates the electric position of the rotor from the angular dependence of the current space vector at an impressed stator flux pattern, wherein the distribution of absolute values of the differential current space vector varies in approximation in sinusoidal manner with twice the value of the electric rotor position angle sought. The method of the invention which can be used in particular in stationary or blocked machines is characterized in that the distribution of absolute values is produced from respectively two successive measurements for an almost inversed magnetization, in such a way that the superposition of the impressed stator flux and permanently excited rotor flux enables, due to saturation, a distribution of absolute values of the current space vector with two different maximum values, from which the electric rotor position angle sought is determined directly and unambiguously over 360°.

19 Claims, 3 Drawing Sheets

U.S. PATENT DOCUMENTS

| | | | |
|---|---|---|---|
| 5,844,385 A | * 12/1998 | Jones et al. | 318/254 |
| 5,955,860 A | * 9/1999 | Taga et al. | 318/700 |
| 5,969,496 A | * 10/1999 | Yamada et al. | 318/715 |
| 6,008,618 A | * 12/1999 | Bose et al. | 318/811 |
| 6,051,946 A | * 4/2000 | Yamada et al. | 318/432 |
| 6,188,196 B1 | 2/2001 | Koide et al. | |
| 6,211,633 B1 | * 4/2001 | Jones et al. | 318/254 |
| 6,531,843 B2 | * 3/2003 | Iwaji et al. | 318/727 |

* cited by examiner

SYSTEM FOR MEASURING MOTOR ROTOR POSITION

TECHNICAL FIELD

The present invention generally relates to a system for measuring motor rotor position and more particularly relates to a system for the sensorless electric measurement of the position of a rotor of a permanently excited synchronous, machine.

BACKGROUND OF THE INVENTION

A system of this general type and the corresponding circuit configuration is disclosed in European patent EP-B-0 539 401. However, disclosed prior art system suffers from several drawbacks including that it operates in a very complex and inaccurate fashion.

BRIEF SUMMARY OF THE INVENTION

In view of the above, an object of the invention is to disclose a method and a circuit configuration for the transmitter-free detection of the position of the rotor of a permanently excited synchronous machine by evaluating exclusively electric quantities which can be used in particular for stationary or blocked machines.

This object is achieved by the present method in that the distribution of absolute values is produced from respectively two successive measurements with an almost inversed magnetization, in such a way that the superposition of the impressed stator flux and permanently excited rotor flux enables, due to saturation, a distribution of absolute values of the current space vector with two different maximum values, from which the electric rotor position angle sought is determined directly and unambiguously over 360°.

In another feature of the method of the invention, a star-like stator flux pattern that passes through zero is impressed which, in the time average, produces almost no torque in the synchronous machine. It is achieved by this measure that devices coupled to the synchronous machine, e.g. an electromechanical vehicle brake operable by the synchronous machine, are not loaded.

In a favorable improvement of the method of the invention, average values of the variations of values of the differential current space vector are produced, and the stator flux pattern is passed through counter-clockwise and clockwise in the individual measurements. It is thereby achieved that offsets of the distribution of absolute values caused by inaccurate or overlapping switching in the converter as well as the low-pass filtering effect of the synchronous machine are compensated.

Another feature of the invention arranges for reduction of defined frequency portions in the power density spectrum. Even if the mass inertia of the rotor avoids vibrations of the synchronous machine during energization—the average time value of the torque is zero—the magnetostriction in the stator sheet causes an audible noise nevertheless. How much noise can be perceived externally depends mainly on the resonance frequencies of the housing. Resonance frequencies can be prevented, however, by adept energization of the, synchronous machine with a frequency-optimized flux pattern.

In another suitable improvement of the method of the invention, the rotor position is determined by cross correlation of the measured distribution of absolute values with a distribution of absolute values stored in tabular form. When only the maximum of the distribution of absolute values is taken into account for evaluation, this is inaccurate because only one of many measuring values is used. The fault of only one measuring value could render the result unusable. The correlation with a predetermined course, however, processes all measuring values and this way reaches a much better accuracy and resistance to jamming. The sought angle of rotation corresponds to the index of the maximum value in the cross-correlated distribution.

A particularly simple evaluation is reached according to another feature of the invention in that the rotor position is determined by zero settings and extreme values of the measured distribution of absolute values.

A precise evaluation by calculated transformation of at least two sampled phase currents into distribution of absolute values and phase variation is achieved in a favorable improvement of the invention in that the distribution of absolute values is calculated from the phase currents by means of inverse Clarcke and Park transformation (ICPT). This measure is appropriate in particular for measurement inaccuracies inferior to 60° electric rotor position angle in connection with a three-phase synchronous machine.

A simplified evaluation where the distribution of absolute values can be determined even without the use of processors can be achieved in that an assessed value of the distribution of absolute values is determined from the total current of the converter by means of a suitable flux pattern. As this occurs, the converter transforms its supply current into the assessed value of the value component by applying special base vectors in the sampling times. The resolution remains at 60° electric rotor position angle when a three-phase motor is employed.

Another advantageous improvement of the invention arranges for differences of current space vectors to be used at different times of the flux pattern or differences of current time areas for determining the distribution of absolute values instead of the time variation of the current space vector. Differences of current space vectors and differences of current time areas permit a higher resolution of the electric rotor position angle sought than the evaluation of the time variation of the current space vector.

To be able to impress a stator flux with high resolution and dynamics, another improvement of the invention provides that a sample of the stator voltage space vector is composed of several base vectors by way of vector modulation and pulse width modulation (vector PWM). Vector modulation composes the stator flux direction from the base vectors that can be represented by the converter, with the pulse width modulation determining the time interval during which the base vectors must be applied.

A circuit configuration for the sensor-free electric rotor position measurement of a permanently excited synchronous machine, with a control signal generating device, a converter for feeding the synchronous machine, and an evaluation device for evaluating the measuring signals generated by the current measuring device is characterized in that the control signal generating device comprises a pattern generator for generating a flux pattern and a sampling signal generator providing control signals for the evaluation device, in that the converter comprises a flux model of the synchronous machine and a current measuring device, wherein the flux model produces from the flux pattern a voltage pattern that is impressed into the synchronous machine, and wherein the current measuring device determines the occurring energization pattern and the evaluation device calculates from the energization pattern the distribution of absolute values of the differential current space vector and determines therefrom the electric rotor position angle sought unambiguously over 360°.

In a favorable improvement of the circuit configuration of the invention, the control signal generation device comprises a clock generator whose clock signal is sent to a counter whose count is supplied to both the pattern generator and the sampling signal generator, wherein the pattern generator predefines a stator flux pattern and the sampling signal generator predefines times for sampling current variations from which the electric rotor position angle sought is determined. A constant time pulse permits simplifying the prior art method mentioned above, according to which there is need to determine the rotor-position-responsive inductance. The reciprocal value of inductance is proportional to the current variation per time unit. When constant time units are used, the method is simplified to evaluation of the current variation. In contrast to the previously mentioned method it is possible to calculate the stator flux pattern off-line and output it from a memory without modification. Preconditions for this operation are the constant time pulse and the stationary synchronous machine.

Preferably by way of a motor flux observer or a flux-measuring device, the flux model produces from the flux pattern a voltage pattern that is sent to a vector pulse width modulator. The synchronous machine reproduces an inductance in the model and, therefore, develops its flux pattern only with delay, with the voltage pattern applied. The delay time depends on the rotor position angle due to the variable inductance. This is taken into consideration by a genuine flux measurement by way of the energization pattern that appears or is modeled in a simplified manner by a low-pass filter with a constant delay.

Another feature of the invention involves that the vector pulse width modulator generates control signals for a polyphase bridge which impresses the energization pattern into the synchronous machine, wherein the phase currents of the polyphase bridge or a supply current of the polyphase bridge or the bridge currents occurring in the polyphase bridge on the 'high' or 'low' sides are measured. The current variations being measured are selected by means of a reversing switch. While the phase currents can be evaluated any time, the current measurement in the polyphase bridge at the 'high' or 'low' side furnishes a suitable measuring value only when the respective bridge branch is energized. The current measuring device at the supply end, however, manages with one single current measurement, yet provides only one usable assessed value when a special control signal vector with the proper direction of projection is applied.

According to another improvement, the evaluation device includes a transformer transforming the current variation selected by the reversing switch and the predetermined stator flux pattern into a distribution of absolute values of the current space vector. This measure allows detecting the electric rotor position angle unambiguously over 360°.

According to another feature of the invention, the evaluation device comprises a sampler with subtraction, to which are sent the distribution of absolute values of the current component and the times furnished by the sampling signal generator, and in which the distribution of absolute values of the differential current space vector is produced. The asymmetry of the saturation that depends on the rotor position is extracted by the difference measurement.

The measuring data available is reduced in another embodiment in that the evaluation device comprises a current-variation evaluating unit that determines the rotor position angle sought from the distribution of absolute values of the differential current space vector.

Fail-safety of the implemented method is finally ensured in another improvement of the circuit configuration of the invention in that the current-variation evaluating unit issues a plausibility signal, which finds out whether the quality of the distribution of absolute values of the differential current space vector is sufficient for the calculation of the electric rotor position angle.

DETAILED DESCRIPTION OF THE PREFERRED EMBODIMENTS

Figure 1:
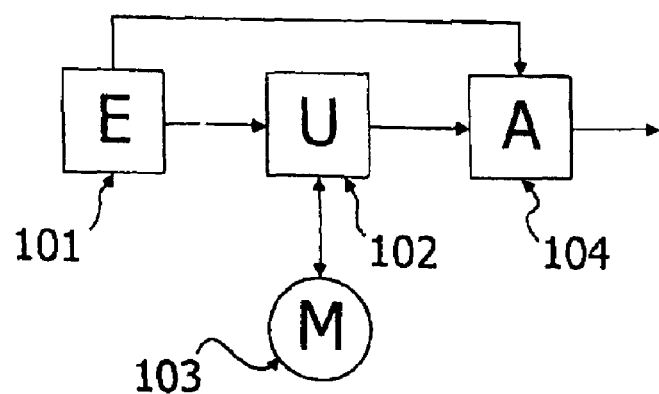
FIG. 1 is a view of simplified wiring diagram of a circuit configuration implementing the system of the present invention.

The circuit configuration illustrated in FIG. 1 is essentially composed of a control signal generating device 101 for generating input or control signals, as well as a converter 102 which provides phase currents for a permanently excited synchronous machine 103 and measuring signals for an evaluation device 104 connected downstream thereof, the output signals of said device representing the sought electric rotor position angle of the synchronous machine 103. The control signals generated by the control-signal generating device 101 are supplied to the converter 102 and the evaluation device 104.

Figure 2:
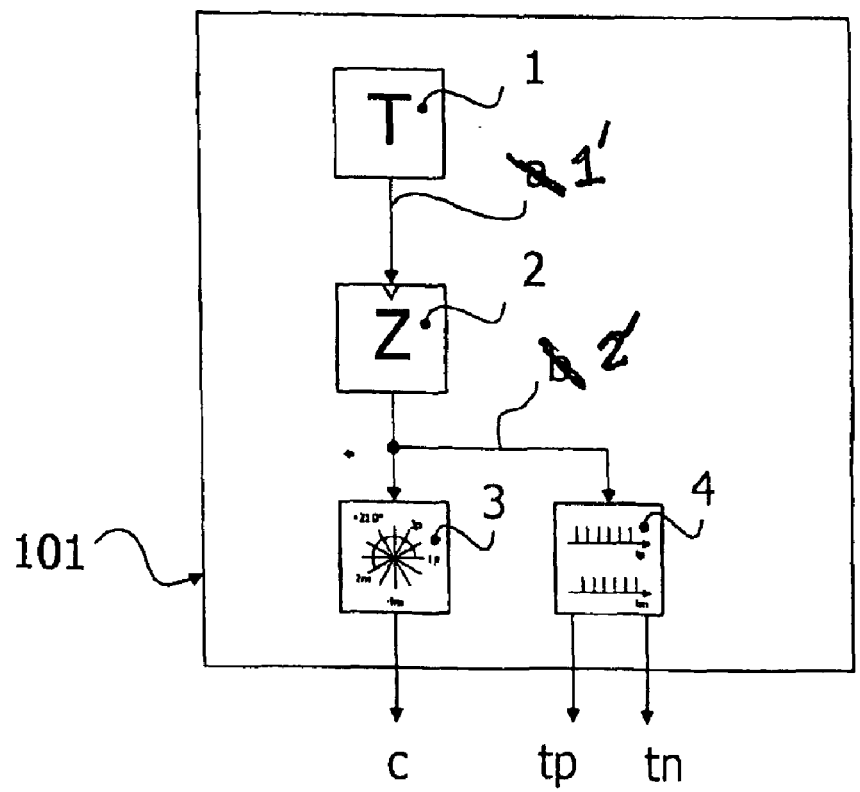
FIG. 2 shows the design of the control signal generation device represented in FIG. 1.

As can be taken from FIG. 2 in particular, the control-signal generating device 101 includes a clock generator 1, a counter 2, a pattern generator 3 and a sampling signal generator 4. The clock signals 1' generated by the clock generator 1 are sent to counter 2 whose output signals 2' are sent to the pattern generator 3 and the sampling-signal generator 4. While the output signal c of the pattern generator 3 predefines a stator flux pattern for the synchronous machine 103 which is composed of succeeding differential stator flux space vectors, the sampling signal generator 4 generates signals that characterize positive and negative sampling times tp, tn for the subsequent evaluation device 104, illustrated in more detail in FIG. 5. The stator flux pattern c predetermined by the pattern generator 3 has a star-like structure and predefines the same course for flux increase and decrease, with repeated passage through zero so that the area enclosed by the pattern or the torque impressed into the synchronous machine 103 is at its minimum. The stator flux pattern can be passed through clockwise and counterclockwise, and any occurring delays in the running time are compensated by averaging operations in the subsequent evaluation device 104. The stator flux pattern likewise has a significant influence on the formation of noise due to magnetostriction in the synchronous machine and, favorably, can be configured so that resonance points of the synchronous machine and connected housing parts are not stimulated. The power density spectrum of the stator flux pattern must be minimized in the vicinity of the resonance frequencies for this purpose.

Figure 3:
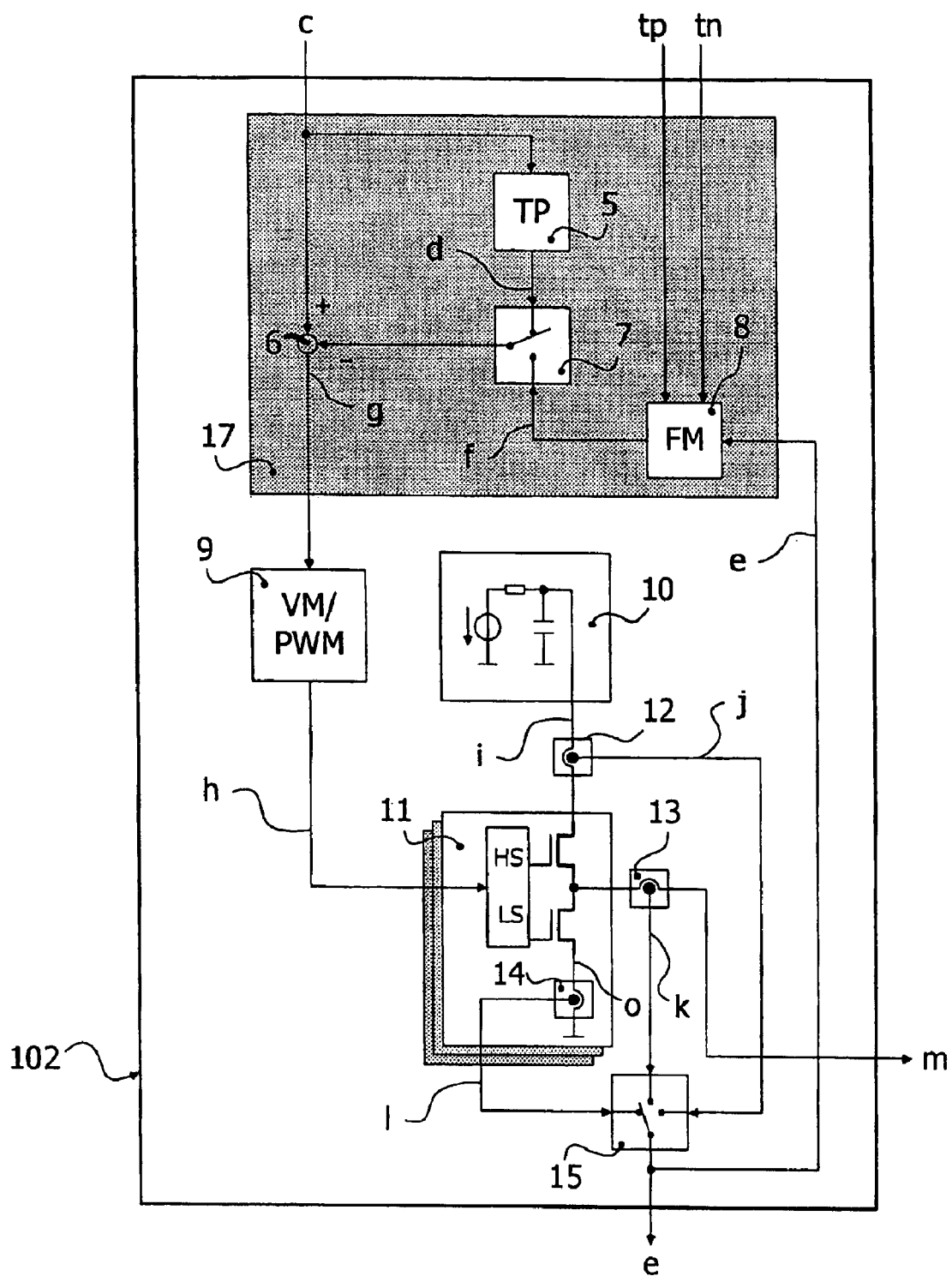
FIG. 3 shows the design of the converter with a current measuring device represented in FIG. 1.

The converter 102 shown in FIG. 3 comprises a flux model 17 composed of a motor flux observer (low-pass filter) 5, a reversing switch 7, a subtractor 6, and a flux measuring device 8. Further, converter 102 includes a vector pulse width modulator 9, a polyphase bridge 11, a current supply 10 associated with the polyphase bridge 11, current-measuring devices 12, 13, 14 and a reversing switch 15. The motor flux observer 5 receives the predetermined stator pattern c of the pattern generator 3 and produces therefrom an assessed stator flux pattern d. In contrast thereto, the flux measuring device 8 discharges the measured stator flux pattern f from the measured phase currents k of the current measuring device 13. The measured stator flux pattern f along with the assessed stator flux pattern d is sent to the inverter 7 which conducts one of the two signals d, f to the subtractor 6 and, hence, chooses between monitoring and measuring the stator flux pattern. The result of the subtraction, which corresponds to the predetermined stator voltage pattern, is applied to the vector pulse width modulator 9 in which the control signals h required for the polyphase bridge 11 are produced. Vector modulation assumes the task of replacing the direction of the instantaneous stator voltage space vector in the stator voltage pattern by base vectors that can be represented by the polyphase bridge 11. Pulse width modulation will define in this arrangement for how long these base vectors must be applied in order to reproduce the predefined stator voltage pattern in approximation. Depending on the method, the reversing switch 15 selects a measured energization pattern e of the different current measuring devices 12 to 14.

Figure 4:
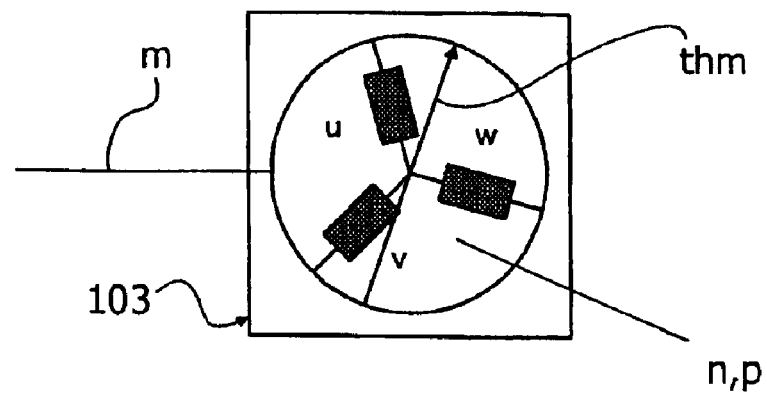
FIG. 4 is a schematic view of a three-phase synchronous machine.

The synchronous machine 103 shown in FIG. 4 is fed with phase currents m of the polyphase bridge 11 and develops a total flux pattern from the vectorial superposition of stator flux pattern and position-responsive rotor flux in dependence on the mechanical rotor position thm, the number of stator teeth n and the number of pole pairs p. This total flux pattern drives the synchronous machine alternatingly into magnetic saturation, with the current requirement in saturation exceeding the current requirement without saturation. As the occurrence of the saturation depends on the electric rotor position angle, it is possible to unambiguously determine the electric rotor position angle from the current requirement when the stator flux pattern is known.

Figure 5:
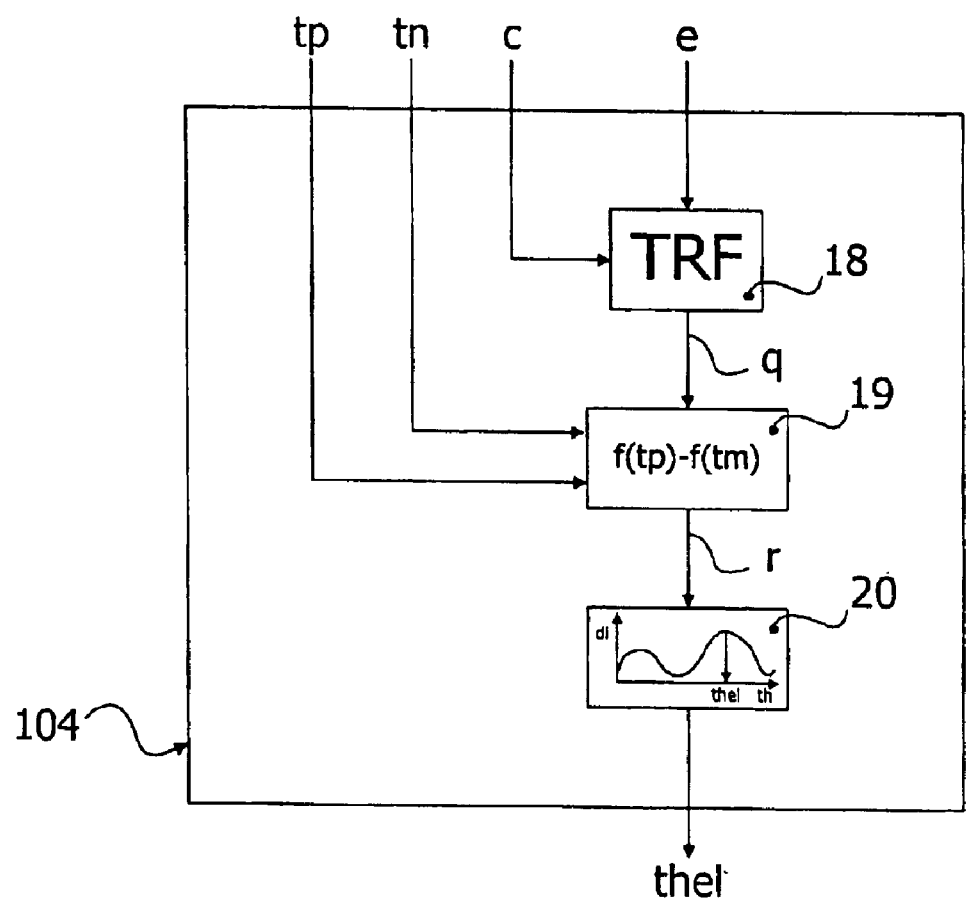
FIG. 5 shows the design of the evaluation device represented in FIG. 1.

The evaluation device 104 illustrated in FIG. 5 comprises a transformer 18, a sampler with subtracting operations 19 and a current-variation evaluating unit 20. Transformer 18 generates by transformation the distribution of absolute values q of the current space vector from the measured energization pattern e and the predetermined stator flux pattern c. The transformer 18 calculates the distribution of absolute values q of the current space vector from the measured energization pattern e either by inverse Clarcke and Park Transformation (ICPT) or, in approximation, by means of the polyphase bridge 11 by projection of the total current in the direction of the impressed stator flux component. The distribution of absolute values q is differentiated by sampler 19 at times tp and tn, whereby the differential distribution of absolute values r of the current space vector is produced. The difference of current time areas may be used in lieu of the differential distribution of absolute values r. Initially, defined time integrals in the interval tp to tn and tn to tp+1 must be formed by way of the distribution of absolute values of the current space vector. There is no integral of back electromotive voltage when the synchronous machine is stationary because this component is zero according to definition. The current-variation evaluating unit 20 will find in the approximately sinusoidally fluctuating differential distribution of absolute values r, which has two maximums of different height, the position of the higher maximum that is directly proportional to the sought electric rotor position angle thel. Further, it outputs a plausibility signal p1 judging the quality of the calculated electric rotor position angle thel. The position of the maximum can either be found by mere consideration of the zero settings and extreme values or obtained by way of including all samples by cross correlation with a model distribution of absolute values stored in tabular form. Zero settings and extreme values follow in an undisturbed measurement in periodic intervals. Plausibility calculation makes use of this feature: when major irregularities occur in the sequence, it will generate an error in the plausibility signal p1 whereupon measurement is repeated. One possible cause for discrepancies in the periodic intervals is an unwanted rotor rotation, impressed from outside, during the measurement.

What is claimed is:

1. Method for measuring the position of a rotor of a permanently excited synchronous machine that is fed by a converter, comprising the stops of:
   measuring signals which are sent to an evaluation device wherein said evaluation device calculates the electric position of the rotor from the angular dependence of the current space vector at an impressed stator flux pattern, wherein the distribution of absolute values of the differential current space vector changes in approximation in sinusoidal manner with twice the value of the electric rotor position angle sought,
   producing a distribution of absolute values of said differential current space vector from respectively two successive measurements using inversed magnetization, in such a way that the superposition of the impressed stator flux and permanently excited rotor flux enables, due to saturation, an distribution of absolute values of the current space vector with two different maximum values, from which the electric rotor position angle sought is determined directly and unambiguously over 360° of rotor rotation.

2. Method as claimed in claim 1, wherein a star-like stator flux pattern is impressed which, when time averaged, produces almost no torque in the synchronous machine.

3. Method as claimed in claim 1, wherein average values of the distribution of absolute values of the differential current space vector are produced, wherein the stator flux pattern is passed through counter-clockwise and clockwise in the individual measurements.

4. Method as claimed in claim 1, wherein defined frequency portions in the power density spectrum of the stator flux pattern are reduced.

5. Method as claimed in claim 1, wherein the rotor position is determined by cross correlation of the measured distribution of absolute values with a distribution of absolute values stored in tabular form.

6. Method as claimed in claim 1, wherein the rotor position is determined by zero settings and extreme values of the measured distribution of absolute values.

7. Method as claimed in claim 1, wherein the distribution of absolute values is calculated from the phase currents by means of inverse Clarcke and Park transformation (ICPT).

8. Method as claimed claim 1, wherein an assessed value of the distribution of absolute values is determined from the total current of the converter by means of a suitable flux pattern.

9. Method as claimed in claim 1, wherein differences of current space vectors at different times of the flux pattern or differences of current time areas are used for determining the distribution of absolute values instead of the time variation of the current space vector.

10. Method as claimed in claim 1, wherein a sample of the stator voltage space vector is composed of several base vectors by way of vector modulation and pulse width modulation.

11. Circuit configuration for the sensor-free electric rotor position measurement of a permanently excited synchronous machine, comprising:
   a control-signal generating device,
   a converter for feeding the synchronous machine, and
   an evaluation device for evaluating measuring signals generated by a current measuring device, wherein the control-signal generating device includes a pattern generator for generating a stator flux pattern and a sampling signal generator providing control signals for the evaluation device, wherein the converter includes a flux model of the synchronous machine and the current measuring device which determines an energization pattern currently present, and wherein the evaluation device calculates from the energization pattern the distribution of absolute values of the differential current space vector and determines therefrom the electric rotor position angle sought unambiguously over 360° of rotor rotation.

12. Circuit configuration as claimed in claim 11, wherein the control signal generating device includes a clock generator whose clock signal is sent to a counter, whose count is supplied to the pattern generator and the sampling signal generator, wherein the pattern generator predefines a stator flux pattern and the sampling signal generator predefines times for sampling current variations from which the electric rotor position angle sought is derived.

13. Circuit configuration as claimed in claim 11, wherein the flux model, by way of a motor flux observer or a flux-measuring device, produces from the stator flux pattern a voltage pattern that is sent to a vector pulse width modulator.

14. Circuit configuration as claimed in claim 13, wherein the vector pulse width modulator generates control signals for a polyphase bridge which impresses the energization pattern into the synchronous machine, wherein the phase currents of the polyphase bridge or a supply current of the polyphase bridge or the bridge currents occurring in the polyphase bridge on the 'high' or 'low' sides are measured.

15. Circuit configuration as claimed in claim 14, wherein the current variations being measured are selected by means of a reversing switch.

16. Circuit configuration as claimed in claim 11, wherein the evaluation device includes a transformer transforming the measured energization pattern selected by the reversing switch into the distribution of absolute values of the current space vector by means of the predetermined stator flux pattern.

17. Circuit configuration as claimed in claim 16, wherein the evaluation device comprises a sampler with subtracting operations, to which is sent the distribution of absolute values of the current space vector and the times furnished by the sampling signal generator and in which the distribution of absolute values of the differential current space vector is produced.

18. Circuit configuration as claimed in claim 17, wherein the evaluation device comprises a current-variation evaluation unit which determines the sought electric rotor position angle from the distribution of absolute values of the differential current space vector.

19. Circuit configuration as claimed in claim 18, wherein the current-variation evaluation unit issues a plausibility signal, which finds out whether the quality of the distribution of absolute values of the differential current space vector is sufficient for the calculation of the electric rotor position angle.

* * * * *